(12) United States Patent
Franck et al.

(10) Patent No.: US 7,591,140 B2
(45) Date of Patent: Sep. 22, 2009

(54) BEVERAGE DISPENSING APPARATUS AND METHOD FOR BEVERAGE DISPENSING

(75) Inventors: Doug Franck, Marietta, GA (US); Darren Wayne Simmons, Peachtree City, GA (US); Daniel J. Peck, Covington, GA (US); Richard Carroll Staten, Woodstock, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 11/837,212

(22) Filed: Aug. 10, 2007

(65) Prior Publication Data

US 2008/0006038 A1 Jan. 10, 2008

Related U.S. Application Data

(60) Division of application No. 11/099,671, filed on Apr. 6, 2005, now Pat. No. 7,337,624, which is a continuation-in-part of application No. 10/397,255, filed on Mar. 27, 2003, now abandoned.

(51) Int. Cl.
A23G 9/12 (2006.01)

(52) U.S. Cl. .............................. 62/68; 62/342; 426/524

(58) Field of Classification Search ........... 62/342–343, 62/68; 99/275; 426/393, 524
See application file for complete search history.

(56) References Cited

U.S. PATENT DOCUMENTS

| | | |
|---|---|---|
| 3,357,199 A | 12/1967 | Harnish |
| 3,389,576 A | 6/1968 | Mauer |
| 3,400,551 A | 9/1968 | Booth et al. |
| 3,481,152 A | 12/1969 | Seeley |
| 3,633,376 A | 1/1972 | Miner |
| 3,759,056 A | 9/1973 | Graben |
| 3,769,810 A | 11/1973 | Swartout |
| 4,139,356 A | 2/1979 | Hattori |
| 4,450,692 A | 5/1984 | Sharpe et al. |
| 4,707,997 A | 11/1987 | Bigler et al. |
| 5,211,025 A | 5/1993 | Ni et al. |
| 5,535,600 A | 7/1996 | Mills |

(Continued)

FOREIGN PATENT DOCUMENTS

JP 2003/042610 2/2003

(Continued)

OTHER PUBLICATIONS

International Search Report for International Application No. PCT/US2004/008793, European Patent Office, mailed Jul. 27, 2004.

(Continued)

*Primary Examiner*—William E Tapolcai
(74) *Attorney, Agent, or Firm*—Finnegan, Henderson, Farabow, Garrett & Dunner LLP

(57) ABSTRACT

A method of regulating the refrigerant temperature for a beverage machine, including a refrigeration system for producing a frozen beverage, operating at least one compressor at a speed to flow the refrigerant through the refrigeration system of the beverage machine and cooling the refrigerant with at least one condenser. The method may also include controllably varying the flow of air across the at least one condenser or the speed of the at least one compressor.

6 Claims, 4 Drawing Sheets

U.S. PATENT DOCUMENTS

| | | |
|---|---|---|
| 5,671,607 A | 9/1997 | Clemens et al. |
| 5,894,734 A | 4/1999 | Morishita et al. |
| 6,010,734 A * | 1/2000 | Whelan et al. ............. 426/565 |
| 6,155,461 A | 12/2000 | Ishihara et al. |
| 6,205,803 B1 | 3/2001 | Scaringe |
| 6,220,047 B1 | 4/2001 | Vogel et al. |
| 6,513,578 B2 | 2/2003 | Frank |
| 6,923,010 B2 * | 8/2005 | Small et al. .................... 62/68 |
| 7,000,411 B2 | 2/2006 | Kim et al. |
| 2002/0033021 A1 | 3/2002 | Frank |
| 2002/0095944 A1 | 7/2002 | Stensrud et al. |
| 2002/0197371 A1 * | 12/2002 | Lee et al. .................... 426/548 |
| 2002/0197376 A1 | 12/2002 | Broz |
| 2003/0145607 A1 | 8/2003 | Frank |

FOREIGN PATENT DOCUMENTS

| | | |
|---|---|---|
| WO | WO-86/00393 A1 | 1/1986 |
| WO | WO-01/01052 A1 | 1/2001 |

OTHER PUBLICATIONS

International Search Report for PCT/US2004/008793, mailed Jun. 16, 2005.

International Search Report for PCT/US2006/012356, mailed Aug. 8, 2006.

* cited by examiner

BEVERAGE DISPENSING APPARATUS AND METHOD FOR BEVERAGE DISPENSING

CROSS-REFERENCE TO RELATED APPLICATIONS

This application is a divisional of U.S. patent application Ser. No. 11/099,671, filed Apr. 6, 2005 now U.S. Pat. No. 7,337,624, which is a continuation-in-part of U.S. Pat. application Ser. No. 10/397,255, filed Mar. 27, 2003, now abandoned, and which are incorporated herein by reference.

BACKGROUND

The invention relates to a system and method for making frozen beverages and, more specifically, to a system and method for making reduced-calorie ("light") and diet frozen beverages.

Full-calorie frozen beverages are known in the art and have been produced for years. Frozen beverages are produced via devices that freeze a mixture of ingredients including syrup, water, and optionally, carbon dioxide in a mixing chamber. The mixture freezes on the inner surface of the mixing chamber, which is surrounded by a helical coil through which a refrigerant passes. A rotating shaft is disposed inside the chamber, which has a plurality of outwardly projecting blades that scrape the frozen mixture off the inside wall of the mixing chamber. Once the beverage is in the desired frozen state, the product is dispensed from the chamber through a product valve.

Current frozen beverage products are generally limited to full-calorie frozen beverages. Caloric products contain common sugars, such as sucrose or high fructose corn syrup ("HFCS"), which are used as sweeteners. These sugars play an important part in the freezing point depression of frozen beverages. Under normal operating conditions of frozen beverage machines, the addition of caloric sweeteners depresses the freezing point of the product, making them dispensable in a slush-like state. By contrast, a diet beverage—or non-caloric beverage—contains no common sugars such as sucrose or corn syrup, and thus lacks a freezing point depressant. Without this modified freezing point, diet syrup freezes into blocks of ice in a conventional frozen beverage machine.

The degree of sweetness in a beverage is generally listed, or measured, by a brix value. Brix value is generally defined as the percent of soluble solids made up of sugars. A blend having a high brix value generally tends to be sweeter and may be difficult to freeze. On the other hand, a beverage having a low brix value, for example, less than 10, may be too icy when frozen. Since the brix value of diet or low-calorie beverages typically ranges from about 3.5 to about 5.0, commercial success for dispensing diet or low-calorie frozen beverages has been minimal.

In some conventional frozen beverage machines for diet, low-calorie, and reduced-calorie beverages, the freezing point of the syrup is depressed by the addition of sugars and HFCS. This solution, however, may raise the brix value of the beverage beyond the permissible limit for low-calorie, diet, and reduced-calorie products. A frozen beverage machine capable of producing a diet or low-calorie frozen beverage, which has a brix value of less than about 7.5, while having the consistency of a full-calorie frozen beverage (i.e., without large pieces of ice) is desired.

In some beverage machines, the temperature and viscosity of the ingredients within the mixing chamber are maintained by a control system that controls the refrigeration system. Product quality is controlled through the balance of ingredients as well as pressures and temperatures within the chamber.

The present invention may overcome one or more of the problems associated with the production of diet frozen beverages through the use of a refrigeration configuration and/or one or more control schemes that allow the available refrigeration capacity to adjust for dynamic evaporating loads, while maintaining uniform saturation and/or flooding of the evaporator at a controlled desired temperature. Thus, the present invention may enable diet or light-product to freeze uniformly and dispense consistently from initial freeze through extended low-draw conditions. Additionally, the present invention may enable a higher level of control with respect to ice crystal formation, which may enable the equipment to produce products having a consistency that is a closer representation of HFCS-based products.

SUMMARY

As stated earlier, a beverage having a low brix value may be too icy when frozen. The method of the present invention, however, permits the production of frozen beverages with a desired consistency that have an overall brix value from about 0 to about 7.5.

According to one aspect of the invention, a refrigeration system for use in the beverage dispenser may comprise at least one condensing fan. The one or more condensing fans may each operate at varying speeds, depending on the desired air flow across the condenser. The varying speeds may either involve using a variable speed controller, which allows the speed of a fan to be incrementally adjusted over many speeds, or a multiple-speed fan controller, which permits the speed of a fan to be adjusted between a finite number of speeds (e.g., low, medium, or high). Alternatively, the desired flow of air flow across the condenser may be achieved by alternating one or more condensing fans between energized (i.e., on) to de-energized (i.e., off).

According to another aspect of the invention, a refrigeration system for use in the beverage dispenser may comprise at least one louver. The one or more louvers can each be adjusted between opened and closed to permit, adjust, or restrict the flow of air across the condenser.

According to yet another aspect of the invention, the desired temperature of the refrigerant across the evaporator may be controlled from about 15° F. to about 30° F.

According to still another aspect of the invention, a refrigeration system for use in the beverage dispenser may comprise at least one adjustable-speed compressor. The one or more compressors' speeds may be adjusted by either a variable speed control, which allows the speed of the compressor to be incrementally adjusted over many speeds, or a multiple-speed pump control, which permits the speed of the compressor to be adjusted from a finite number of speeds (e.g., low, medium, or high).

According to still another aspect of the invention, a refrigeration system for use in the beverage dispenser may comprise at least one accumulator and at least one hot-gas bypass valve. The one or more hot-gas bypass valves' positions may be adjusted to cause at least some refrigerant to flow from a compressor outlet to an accumulator without first entering a condenser or evaporator.

According to still another aspect of the invention, a refrigeration system for use in the beverage dispenser may comprise at least one defrost bypass valve. The one or more defrost bypass valves' positions may be adjusted to cause at least some refrigerant to flow from a compressor outlet to an expansion valve inlet without first entering the condenser or condenser bypass valve.

According to still another aspect of the invention, a refrigeration system for use in the beverage dispenser may comprise at least one condenser bypass valve. The one or more condenser bypass valves' positions may be adjusted to cause at least some refrigerant to flow from a condenser inlet to a condenser outlet without first entering a condenser.

According to still another aspect of the invention, a refrigeration system for use in the beverage dispenser may comprise at least one liquid line bypass valve. The one or more liquid line bypass valves' positions may be adjusted to cause at least some refrigerant to flow from a condenser outlet to an accumulator without first entering an evaporator.

The reader should understand that both the foregoing general description and the following detailed description are exemplary and explanatory only and are not restrictive of the invention.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

Figure 1:
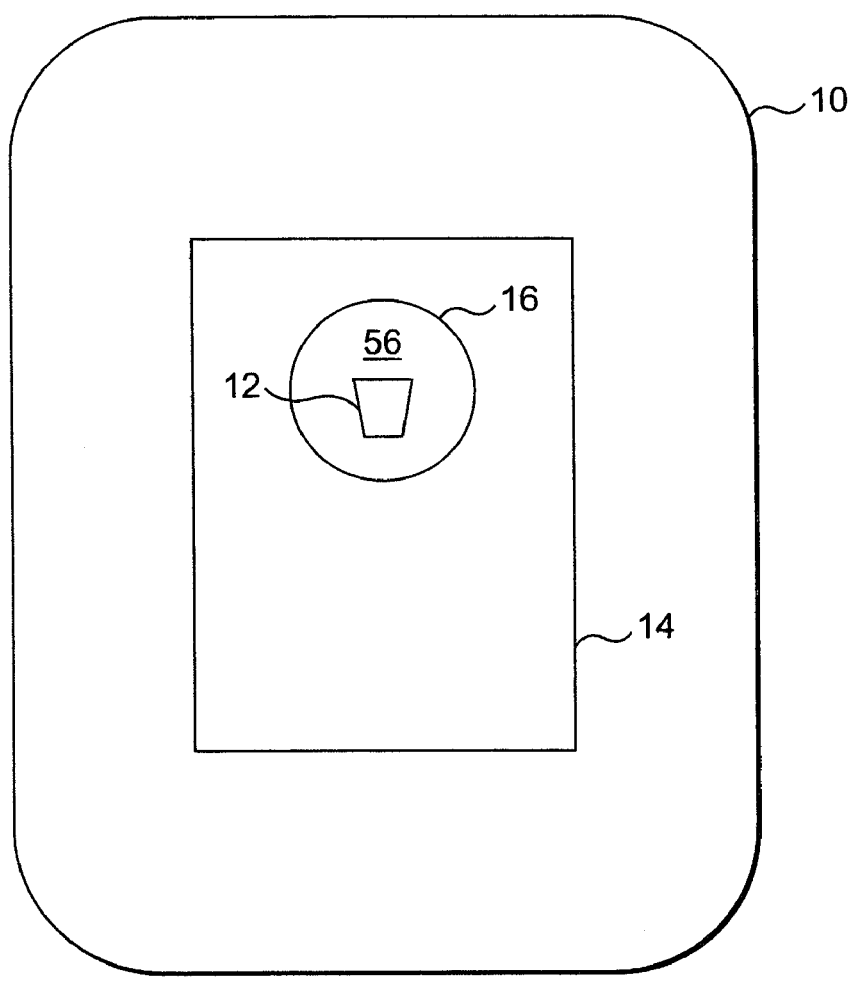
FIG. 1 is a schematic view of a beverage dispenser consistent with exemplary aspects of the invention.

In accordance with the invention, a refrigeration system 14 for use in, for example, a frozen beverage machine 10 is provided. Referring to FIG. 1, a frozen beverage machine 10 may include a container 16, which is configured to contain a beverage 56, a dispenser 12 for dispensing the frozen beverage 56 from the machine 10, and a refrigeration system 14 for cooling the beverage 56.

Figure 2:
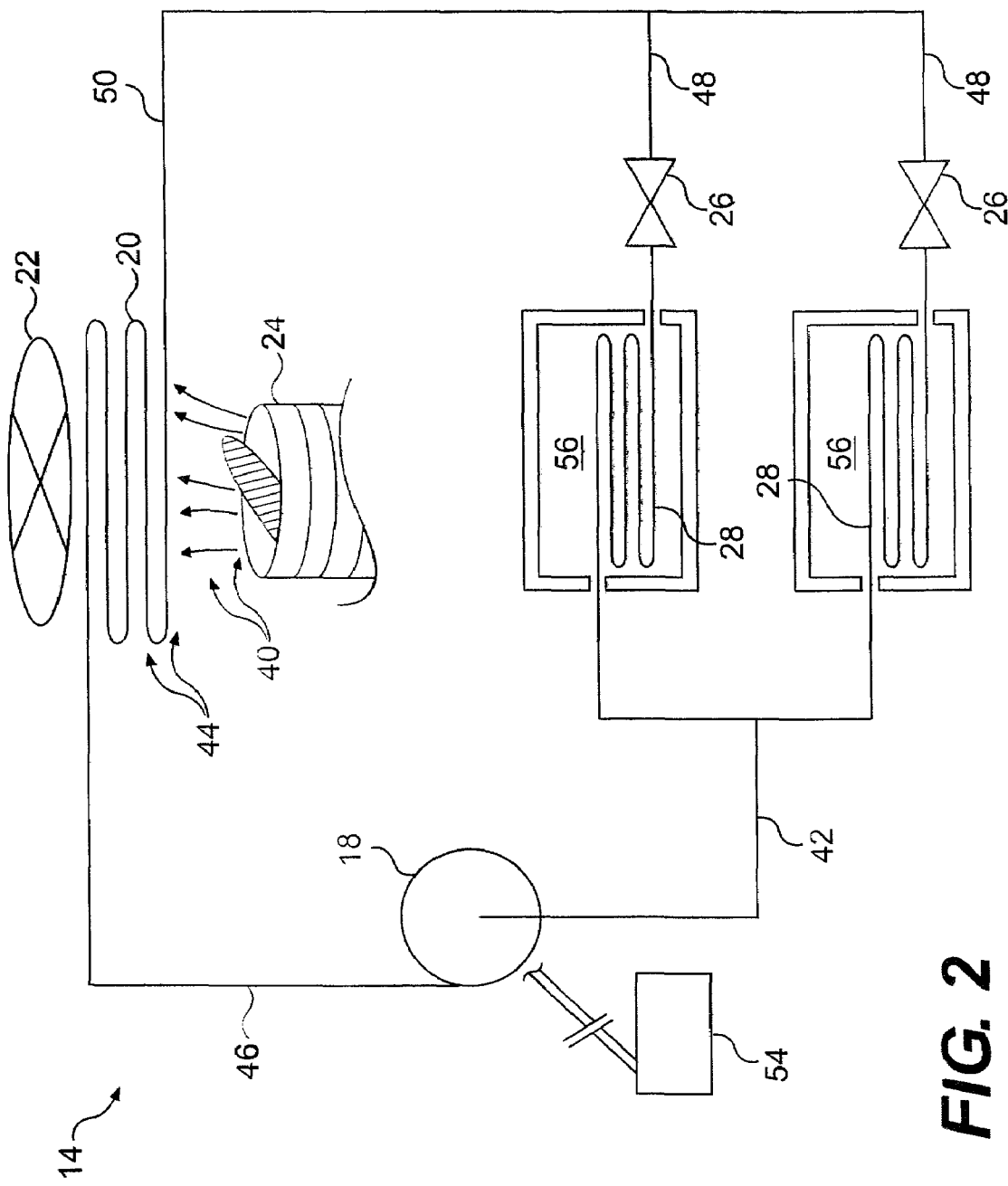
FIG. 2 is a schematic view of a refrigeration system in accordance with at least one exemplary aspect of the invention.

Referring now to FIG. 2, the refrigeration system 14 may include a compressor 18, a condenser 20, and at least one evaporator 28. The refrigeration system 14 transfers thermal energy from the beverage 56 to the ambient environment 44 via a refrigerant, for example, freon.

The compressor 18 comprises a pump, for example, an electrical pump, that compresses the refrigerant in the refrigeration system 14 and sends it to the condenser 20 and then into the evaporator 28. The refrigerant is returned to the compressor 18 through a compressor suction line 42.

The condenser 20 comprises a heat exchanger, which may include coils stacked, for example, under or behind the frozen beverage machine 10. The condenser 20 is configured to remove thermal energy—or heat—from the refrigerant and transfers the heat to the ambient environment 44. During this heat transfer, the refrigerant may undergo a phase transformation from gaseous to liquid form.

The refrigeration system 14 may also include one or more condensing fans 22 associated with the condenser 20. The condensing fan 22 circulates air across the condenser 20 to improve the convective heat transfer from the refrigerant to the ambient environment 44.

The refrigeration system 14 may also include one or more expansion valves 26. Each expansion valve 26 has a high-pressure inlet 48—where liquid refrigerant enters—and a low-pressure outlet 49—where liquid refrigerant exits. The expansion valve 26 lowers the pressure of the refrigerant before the refrigerant enters the evaporator 28. The lower pressure permits the refrigerant to "boil" or undergo a phase transformation from liquid to vapor in the evaporator 28. Alternatively, a capillary tube can be used to effectuate this pressure drop. After the liquid refrigerant exits the expansion valve 26, the refrigerant enters the evaporator 28 where it once again absorbs heat from the beverage 56 and thus begins another cycle through the system 14.

The evaporator 28 comprises a heat exchanger configured to "cool" the beverage 56. In the evaporator 28, thermal energy is transferred from the beverage 56 to the refrigerant. That is, heat is drawn out of the beverage 56, thereby lowering the temperature of the beverage 56. During this heat transfer, the refrigerant may undergo a phase transformation and change from liquid to gaseous form. As can be seen in FIG. 2, multiple evaporators 28 can be used in the refrigeration system 14. Two evaporators 28 are shown in FIG. 2, however, one skilled in the art would recognize that any number of evaporators 28 may effectively be used.

The refrigerant transfers from liquid to gaseous phase ("boils") in the evaporator 28 as it absorbs thermal energy, i.e., heat, from the beverage 56. After the refrigerant has absorbed the thermal energy from the beverage 56, the now vaporous, heat-laden refrigerant passes through a suction line 42 to the compressor 18. The compressor 18 compresses and discharges the vaporized refrigerant to the condenser 20 via the compressor outlet 46. In the condenser 20, some of the refrigerant's thermal energy is transferred to the ambient environment 44. As the refrigerant "cools" in the condenser 20, the refrigerant transfers from its gaseous to its liquid phase (i.e., condenses). From the condenser outlet 50, the liquid refrigerant enters an expansion valve 26.

In the exemplary embodiment of FIG. 2, the refrigeration system 14 includes a louver 24 associated with the condenser 20. Airflow 40 through the louver 24 also passes adjacent to and/or around the condenser 20. The position of the louver 24 may be adjusted incrementally from anywhere between closed to open. Adjusting the position of the louver 24 permits the regulation of airflow 40 across the condenser 20. Although FIG. 2 displays only one louver 24, one skilled in the art would recognize that two or more louvers 24 may effectively be used.

Alternatively or additionally, an exemplary embodiment of the refrigeration system 14 of FIG. 2 may also include a compressor controller 54. The compressor controller 54 can be operated to regulate the speed of the compressor 18. The controller 54 can be cycled "on" and "off" to control the refrigerant temperature. Alternatively, the controller 54 may be a variable-speed controller, which permits the speed of the compressor 18 to be adjusted incrementally and very precisely. Alternatively, the controller 54 may be a multiple-speed controller that includes a finite number of operating speeds, such as, for example, "low," "medium," and "high."

Although FIG. 2 only displays one compressor 18 and one controller 54, one skilled in the art would recognize that two or more compressors 18 and two or more controllers 54 may effectively be used.

Figure 3:
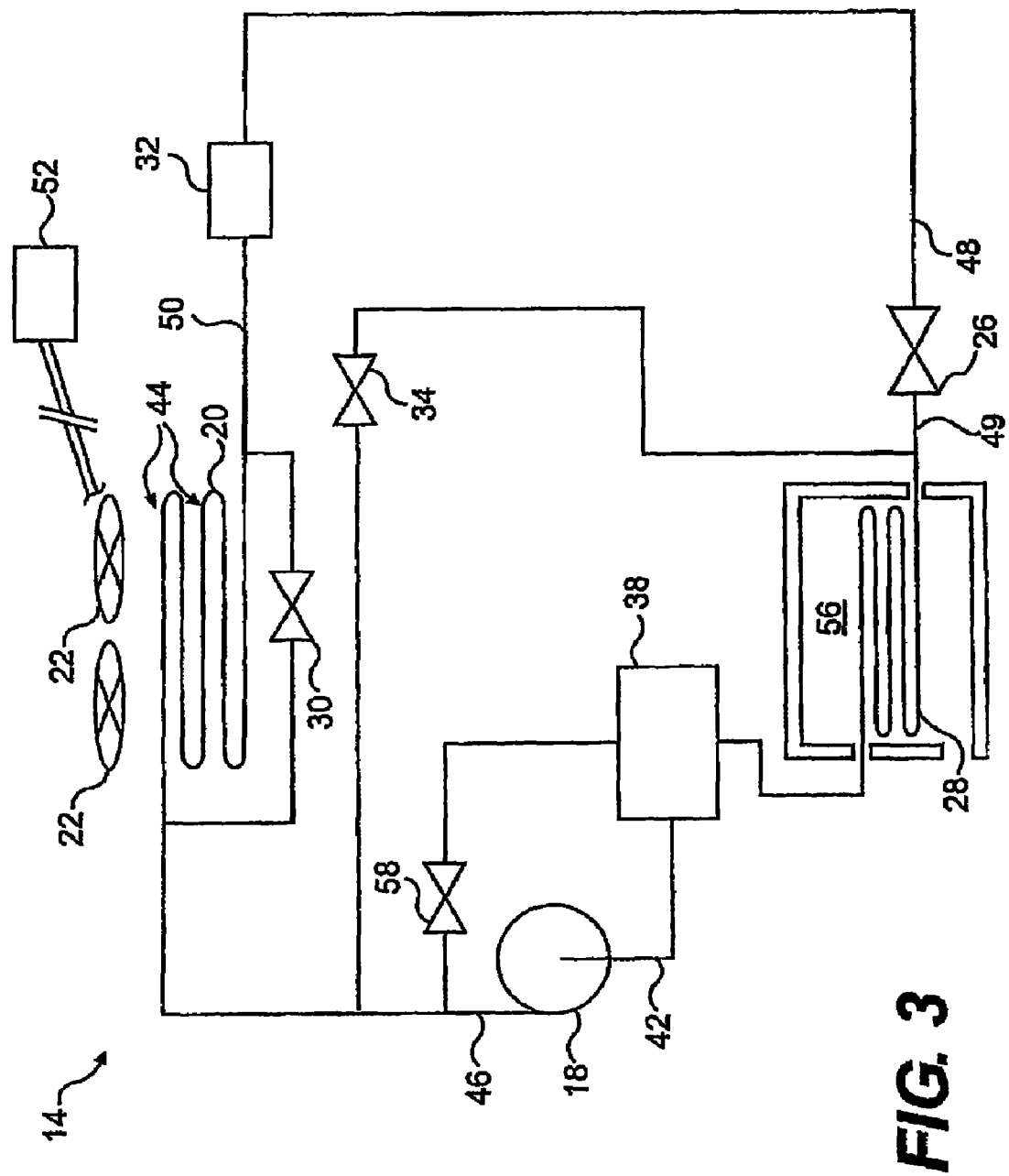
FIG. 3 is a schematic view of another refrigeration system in accordance with at least one exemplary aspect of the invention.

Referring now to FIG. 3, an exemplary embodiment of the refrigeration system 14 may include a defrost bypass valve 34. The defrost bypass valve 34 permits some refrigerant to flow from a compressor outlet 46 to the expansion valve outlet 49 without first entering the condenser 20 or condenser bypass valve 30. Although FIG. 3 only displays one defrost bypass valve 34, one skilled in the art would recognize that two or more defrost bypass valves 34 may effectively be used.

Alternatively or additionally, an exemplary embodiment of the refrigeration system 14 of FIG. 3 may include a condenser bypass valve 30. The condenser bypass valve 30 permits some refrigerant to flow from the compressor outlet 46 to the condenser outlet 50 without first entering the condenser 20. Although FIG. 3 only displays one condenser bypass valve 30, one skilled in the art would recognize that two or more condenser bypass valves 30 may effectively be used.

Alternatively or additionally, an exemplary embodiment of the refrigeration system 14 of FIG. 3 may include an accumulator 38 and a hot-gas bypass valve 58. The hot-gas bypass valve 58 permits some refrigerant to flow from the compressor outlet 46 to the accumulator 38 without first entering the condenser 20, condenser bypass valve 30, and evaporator 28. Although FIG. 3 only displays one accumulator 38 and one hot-gas bypass valve 58, one skilled in the art would recognize that two or more accumulators 38 and two or more hot-gas bypass valves 58 may effectively be used.

Alternatively or additionally, an exemplary embodiment of the refrigeration system 14 of FIG. 3 may include a condensing fan controller 52. The condensing fan controller 52 can be operated to adjust the speed of the condensing fan 22 and the controller 52 permits the condensing fan 22 to operate independent of the compressor 18. The controller 52 can be cycled between "on" and "off" to control the refrigerant temperature. Alternatively, the controller 52 may be a variable-speed controller, which permits the speed of the fan 22 to be adjusted very precisely. Alternatively, the controller 52 may be a multiple-speed controller that includes a finite number of operating speeds, such as, for example, "low," "medium," and "high."

Alternatively or additionally, an exemplary embodiment of the refrigeration system 14 of FIG. 3 may include a plurality of condensing fans 22. The fans 22 may be operated singly, in unison, or in any other combination. For example, a four-fan configuration may be operated as follows: one fan can be operated at "high" while a second fan is de-energized (i.e., in "off") and while the third and fourth fans are operated at "medium" speed. Although FIG. 3 only displays two fans 22, one skilled in the art would recognize that any number of fans 22 and controllers 52 may effectively be used.

As can be seen in FIG. 3, the system 14 may include a drier 32, which removes water moisture from the system 14.

Figure 4:
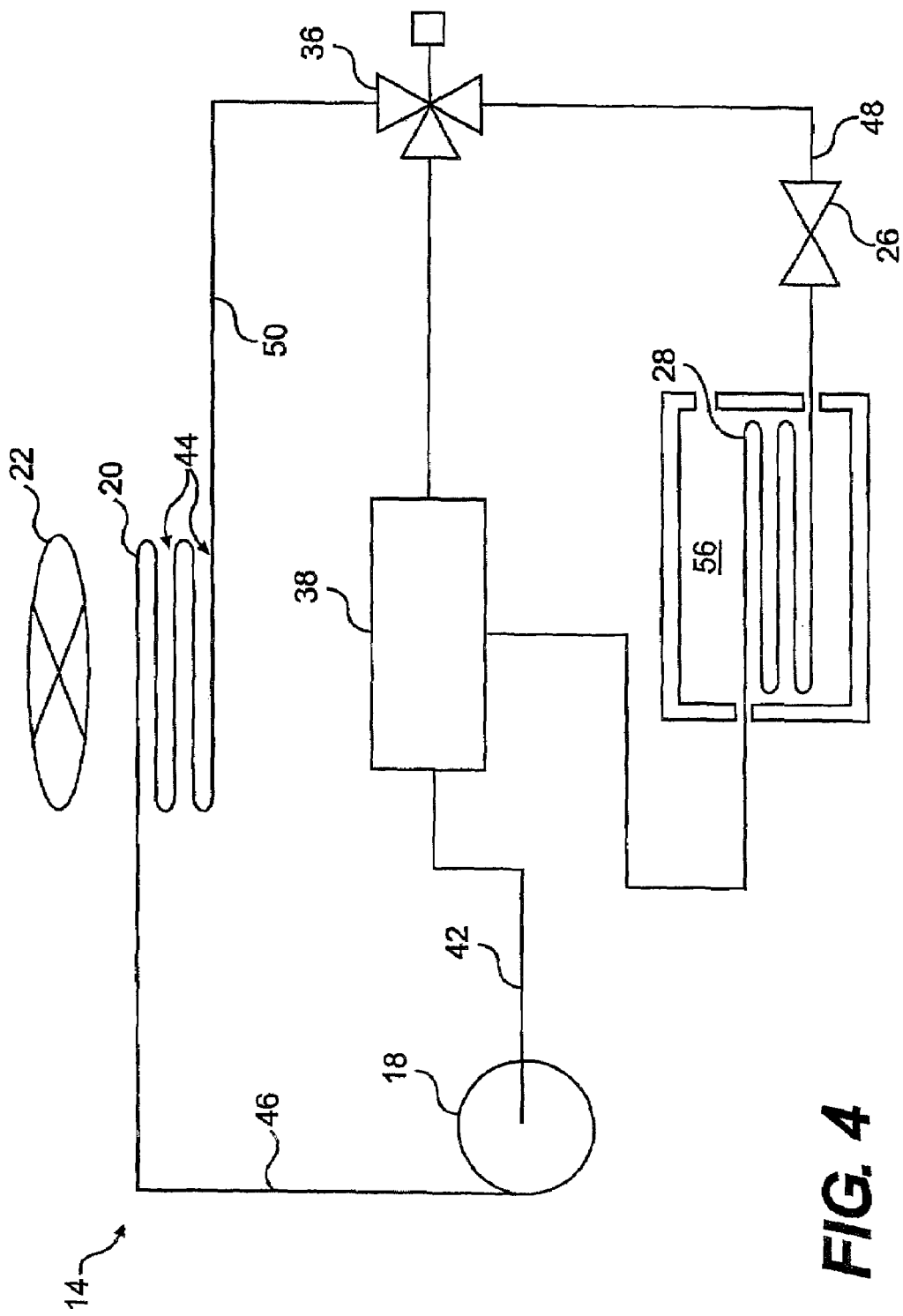
FIG. 4 is a schematic view of another refrigeration system in accordance with at least one exemplary aspect of the invention.

Referring now to FIG. 4, an exemplary embodiment of the refrigeration system 14 may include an accumulator 38 and a liquid line bypass valve 36. The liquid line bypass valve 36 may be a three-way valve that, when in the "bypass position," permits some refrigerant to flow from the condenser outlet 50 to the accumulator 38 without first entering the expansion valve 26 or evaporator 28. The accumulator 38 comprises a storage tank that receives liquid refrigerant, usually from the evaporator 28, and prevents it from flowing into the suction line 42 before vaporizing. Although FIG. 4 only displays one accumulator 38 and one liquid line bypass valve 36, one skilled in the art would recognize that two or more accumulators 38 and two or more liquid line bypass valves 36 may effectively be used.

Any of the exemplary embodiments listed above can be combined to further regulate the temperature of the refrigeration system 14. Additionally, adjusting a refrigerant charge may further be used to regulate the temperature of the refrigeration system 14.

Any of the exemplary embodiments of FIGS. 2-4 described above permit the control of the refrigerant's temperature through the refrigeration system 14. In an exemplary embodiment, the refrigeration system 14 may be used to maintain the temperature of the refrigerant in the evaporator 28 from about 15° F. to about 30° F.

For example, regulating the refrigerant's temperature may be accomplished by any one of the following, either alone or in combination: the speed of one or more condensing fans 22 may be adjusted; one or more condensing fans 22 can be cycled from "on" to "off"; the louver 24 may be positioned from anywhere between "shut" to "open"; the hot-gas bypass valve's 58 position can be adjusted; the defrost bypass valve's 34 position can be adjusted; the one or more condenser bypass valves' 30 positions may be adjusted; the liquid line bypass valve's 36 position may be adjusted; the speed of one or more compressors 18 may be adjusted; and the type or quantity of the refrigerant may be adjusted.

It will be apparent to those skilled in the art that various modifications and variations can be made to the structure and methodology of the present invention without departing from the scope or spirit of the invention. Thus, it should be understood that the invention is not limited to the examples discussed in the specification. Rather, the present invention is intended to cover modifications and variations of this invention.

What is claimed is:

1. An apparatus for dispensing a partially frozen diet beverage comprising:
   a cooling system configured to partially freeze a diet beverage having a brix value lower than a brix value of a nondiet beverage, the diet beverage partially frozen to a substantially slushy state; and
   a dispenser configured to dispense a partially frozen diet beverage in a substantially slushy state.

2. The apparatus of claim 1, wherein the brix value of the diet beverage is between about 0 and about 7.5.

3. The apparatus of claim 1, wherein the diet beverage has a freezing point that is higher than a freezing point of the nondiet beverage, and the cooling system includes a controller configured to control the cooling system to compensate for the higher freezing point of the diet beverage and prevent substantially large pieces of ice from forming in the partially frozen diet beverage.

4. A method for dispensing a partially frozen diet beverage comprising:
   partially freezing a diet beverage having a brix value lower than a brix value of a nondiet beverage, the diet beverage partially frozen to a substantially slushy state; and
   dispensing a partially frozen diet beverage in a substantially slushy state.

5. The method of claim 4, wherein the brix value of the diet beverage is between about 0 and about 7.5.

6. The method of claim 4, wherein the step of partially freezing includes the step of providing a cooling system configured to partially freeze the diet beverage, and the step of dispensing includes providing a dispenser.

* * * * *